United States Patent

Moller

(10) Patent No.: US 9,878,234 B2
(45) Date of Patent: Jan. 30, 2018

(54) INCORPORATING OBJECTIVE ASSESSMENTS OF FANTASY-TEAM-OWNERS' PHYSICAL ACTIVITY INTO FANTASY SPORT PLATFORMS

(71) Applicant: Arlen Moller, Chicago, IL (US)

(72) Inventor: Arlen Moller, Chicago, IL (US)

(*) Notice: Subject to any disclaimer, the term of this patent is extended or adjusted under 35 U.S.C. 154(b) by 880 days.

(21) Appl. No.: 14/088,632

(22) Filed: Nov. 25, 2013

(65) Prior Publication Data

US 2014/0163705 A1    Jun. 12, 2014

Related U.S. Application Data

(60) Provisional application No. 61/735,220, filed on Dec. 10, 2012.

(51) Int. Cl.
| | |
|---|---|
| *A63F 13/00* | (2014.01) |
| *A63F 13/40* | (2014.01) |
| *A63F 13/30* | (2014.01) |
| *G06Q 10/06* | (2012.01) |
| *G06Q 50/34* | (2012.01) |

(52) U.S. Cl.
CPC .............. *A63F 13/00* (2013.01); *A63F 13/10* (2013.01); *A63F 13/12* (2013.01); *G06Q 10/0639* (2013.01); *G06Q 50/34* (2013.01); *A63F 2300/69* (2013.01)

(58) Field of Classification Search
None
See application file for complete search history.

(56) References Cited

U.S. PATENT DOCUMENTS

| | | | |
|---|---|---|---|
| 6,656,042 B2 | 12/2003 | Reiss et al. | |
| 7,977,253 B2 | 7/2011 | Nakamura et al. | |
| 7,980,997 B2* | 7/2011 | Thukral | A63B 24/0059 463/1 |
| 7,988,560 B1* | 8/2011 | Heller | A63F 9/24 463/40 |
| 8,105,159 B2 | 1/2012 | Wojewoda et al. | |
| 8,282,491 B2 | 10/2012 | Auterio et al. | |
| 8,287,383 B1 | 10/2012 | Etter et al. | |
| 8,340,794 B1 | 12/2012 | Trdinich et al. | |
| 8,348,768 B2 | 1/2013 | Auterio et al. | |
| 8,357,044 B2 | 1/2013 | Ng et al. | |
| RE44,095 E | 3/2013 | Sanchez | |
| 8,647,201 B1* | 2/2014 | Jehamy | A63F 13/65 463/31 |
| 2004/0266535 A1* | 12/2004 | Reeves | A63F 13/12 463/42 |
| 2006/0252476 A1* | 11/2006 | Bahou | A63F 13/12 463/4 |
| 2007/0197274 A1* | 8/2007 | Dugan | A63F 13/52 463/7 |
| 2007/0265043 A1* | 11/2007 | Wang | A63F 13/12 463/2 |

(Continued)

OTHER PUBLICATIONS https://www.fitocracy.com/, "Fitness Motivation", web page available prior to Feb. 22, 2013 (3 pages).

(Continued)

*Primary Examiner* — Tramar Harper
(74) *Attorney, Agent, or Firm* — Hamilton, Brook, Smith & Reynolds, P.C.

(57) ABSTRACT

A method and system that involves articulating a set of methods for incorporating objective assessments of fantasy-team-owners' physical activity into Fantasy Sport platforms.

19 Claims, 14 Drawing Sheets

(56) References Cited

U.S. PATENT DOCUMENTS

| | | | |
|---|---|---|---|
| 2008/0102911 A1* | 5/2008 | Campbell | G06F 17/30867 463/9 |
| 2008/0146302 A1* | 6/2008 | Olsen | A63F 13/335 463/7 |
| 2008/0161113 A1* | 7/2008 | Hansen | A63F 13/12 463/42 |
| 2008/0176655 A1 | 7/2008 | James et al. | |
| 2010/0069148 A1* | 3/2010 | Cargill | A63F 13/65 463/25 |
| 2011/0034225 A1* | 2/2011 | Butz, Jr. | A63F 13/12 463/4 |
| 2011/0065504 A1* | 3/2011 | Dugan | G06F 19/26 463/31 |
| 2011/0256910 A1* | 10/2011 | Sloan | A63F 13/10 463/2 |
| 2012/0283855 A1 | 11/2012 | Hoffman et al. | |
| 2012/0289340 A1 | 11/2012 | Pawson | |
| 2012/0315986 A1 | 12/2012 | Walling | |

OTHER PUBLICATIONS http://www.nerdfitness.com/rising-heroes/, "Rising Heroes", web page available prior to Feb. 22, 2013 (4 pages).

https://www.zombiesrungame.com, "Get Fit. Escape Zombies. Become a Hero", web page available prior to Feb. 22, 2013 (7 pages).

http://gadgetwise.blogs.nytimes.com/2010/03/23/a-parents-guide-to-the-pokewalker/?_php=true&_type=blogs&_r=0; NY Times; Mar. 23, 2010.

* cited by examiner

| Fantasy-Team-Owner | Draft Order |
|---|---|
| Owner A | 1 |
| Owner B | 2 |
| Owner C | 3 |
| Owner D | 4 |
| Owner D | 5 |
| Owner B | 6 |
| Owner C | 7 |
| Owner A | 8 |

| Fantasy-Team-Owner | Pre-Season Activity |
|---|---|
| Owner A | 12,089 steps |
| Owner B | 12,074 steps |
| Owner C | 11,991 steps |
| Owner D | 9,867 steps |

FIG. 2

Figures 3C, 4A:
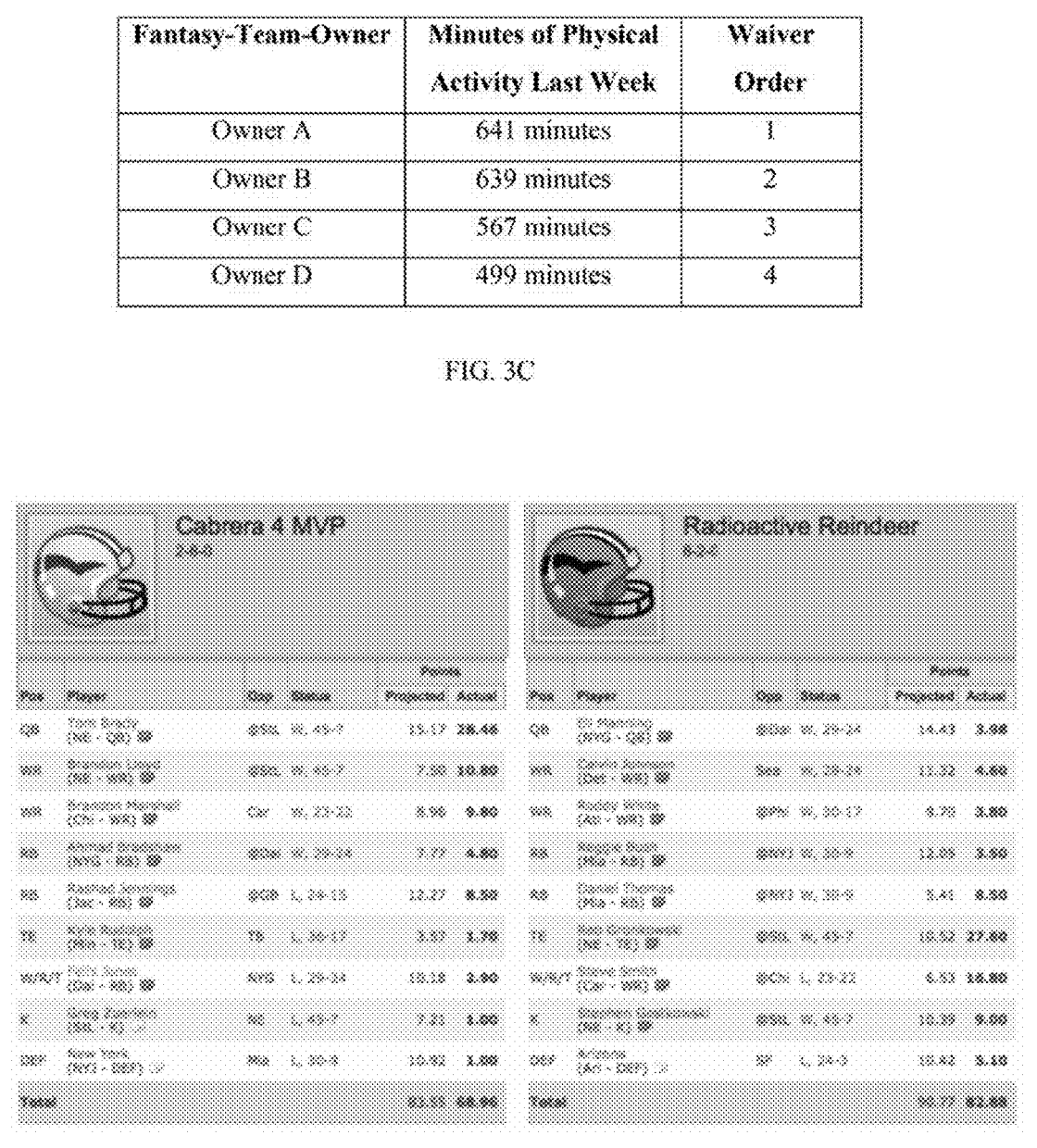

| Fantasy-Team-Owner | Minutes of Physical Activity Last Week | Waiver Order |
|---|---|---|
| Owner A | 641 minutes | 1 |
| Owner B | 639 minutes | 2 |
| Owner C | 567 minutes | 3 |
| Owner D | 499 minutes | 4 |

Overview

Salary Cap

The Salary Cap is fixed at $100 million for the 2012 season. Users are required to maintain a Team Value at or below this $100 million cap. The difference between the Salary Cap and your Team Value is captured as Available Cap Room. This value may be used to buy additional players, or swap out cheaper players on your roster for more expensive ones.

Player Salaries

The Starting salary for all players was assigned based on each player's average performance over the previous two seasons. As the season progresses, each player's value shifts according to his weekly performance. Players performing well will increase in value, while players underperforming will decrease.

Values

| | |
|---|---|
| $ | All dollar values listed in millions |
| Price | Roster Page: Market value change since originally purchased |
| | Player Transaction Page: Market value change over last week |
| Change | Roster Page: Reflects value paid for an individual player |
| | Player Transaction Page: Reflects that player's current market value |

FIG. 6

INCORPORATING OBJECTIVE ASSESSMENTS OF FANTASY-TEAM-OWNERS' PHYSICAL ACTIVITY INTO FANTASY SPORT PLATFORMS

CROSS REFERENCE TO RELATED APPLICATION

This patent application claims the benefit of U.S. Provisional Patent Application Ser. No. 61/735,220, filed on 10 Dec. 2012. The provisional patent application is hereby incorporated by reference herein in its entirety and is made a part hereof, including but not limited to those portions which specifically appear hereinafter.

BACKGROUND OF THE INVENTION

This proposed system represents an improvement to an existing product or process, referred to herein as "Fantasy Sport."

Fantasy Sport (also known as rotisserie, roto, or owner simulation) is a type of online game in which participants build and manage a fantasy team comprised of real individual players or teams of a professional (or college) sport. These teams then compete against the teams of other fantasy-team-owners in the same league. A variant converts statistical performance of real individual players or teams into points that are by each fantasy team. These point systems can be manually calculated by a "league commissioner." Some variants of Fantasy Sports use computer modeling based on statistical input generated by professional (or college) sports (rather than manual calculations). In Fantasy Sports there is the ability to draft, trade, cut, and sign players, like a real sports team owner or manager. Variations of Fantasy Sports include: Fantasy Baseball, Fantasy Football, Fantasy Basketball, Fantasy Golf, Fantasy Auto Racing, Fantasy Cricket, Fantasy Hockey, Fantasy Wrestling, and Fantasy Mixed Martial Arts.

The concept of picking real players and running a contest based on their statistical performance originated in the late 1950s when. Wilfred Winkenbach devised Fantasy Golf. In the original version of Fantasy Golf, each player selected a team of professional golfers and the player with the lowest combined strokes at the end of the tournament wins. Daniel Okrent is credited with inventing Fantasy Baseball in 1980 ("La Rotisserie"). The game's innovation was that fantasy-team-owners in a Rotisserie league draft teams comprised of active Major League Baseball players and would follow their statistics over time through the entire season to compile their scores week after week (rather than using statistics for seasons whose outcomes were already known). Thus, fantasy-team-owners would be required to make predictions about players' playing time, health, and expected performance week after week throughout the season. The next major advance in Fantasy Sport was the migration to the Internet in the mid-1990s. Online Fantasy Sports facilitated the task of tracking statistics and calculating fantasy scores. Moving to an online platform also facilitated the introduction of new features, including real-time statistics and scoring updates, as well as opportunities for social interaction. Today's Online Fantasy Sport platforms offer rich social networking features, including fantasy-team-owner profiles, online message boards, and private electronic messaging.

U.S. application no. 2008/0176655 A1 discloses a system and method for implementing an interactive online community utilizing an activity monitor. The '655 application discloses generic interactive online community or game environment features be built alongside or in support of activity monitoring. The '655 application includes a set of straightforward methods for translating activity into points in an online game environment.

In most variety of contemporary Fantasy Sport, whether administered online or manually, the game is a sedentary activity with regard to fantasy-team-owners.

SUMMARY OF THE INVENTION

A method of using physical activity data in a fantasy sport gaming platform comprising receiving physical activity data relating to at least one user of a fantasy sport gaming platform by use of one or more processors; using the physical activity data to provide an advantage to at least one user of a fantasy sport gaming platform. In one embodiment, providing the advantage to the at least one user includes setting a fantasy draft order based on the physical activity data. In one embodiment, providing the advantage to the at least one user includes setting a waiver wire selection order based on the physical activity data. In one embodiment, providing the advantage to the at least one user includes awarding bonus points based on the physical activity data. In one embodiment, providing the advantage to the at least one user includes using a handicapping system based on the physical activity data to facilitate competition with at least one additional user.

In one embodiment, providing the advantage to the at least one user includes awarding virtual or tangible rewards based on the physical activity. In one embodiment, providing the advantage to the at least one user includes the number of transactions based on the physical activity data. In one embodiment, providing the advantage to the at least one user includes the "payroll" available for acquiring athletes based on the physical activity data. Some embodiments further provide visualizations of the physical activity data.

Some embodiments also include detecting fraudulent or falsely inflated physical activity data and levying sanctions against the at least one user upon said detection. In one embodiment, providing the advantage to the at least one user includes activity contingent loss of at least one player from a team owner's roster based on the physical activity data. In one embodiment, providing the advantage to the at least one user includes contingent access to a fantasy sport league message board based on the physical activity data. In one embodiment, providing the advantage to the at least one user includes at least one user of the fantasy sport gaming platform setting personal physical activity goals that impact the physical activity data.

While various embodiments of the present invention have been shown and described, it should be understood that other modifications, substitutions and alternatives are apparent to one of ordinary skill in the art.

BRIEF DESCRIPTION OF THE DRAWINGS

The foregoing will be apparent from the following more particular description of example embodiments of the system, as illustrated in the accompanying drawings in which like reference characters refer to the same parts throughout the different views. The drawings are not necessarily to scale, emphasis instead being placed upon illustrating embodiments of the present system.

FIG. 2 is an example of a draft order for a Fantasy Sport league with four teams (Owners A through D).

FIG. 3C is a table illustrating a modified system, in which weekly waiver wire priority is set based on fantasy-team-owners' physical activity.

FIG. 4A is a screen shot taken from a Yahoo.com Fantasy Football league page illustrating an example embodiment of scoring in a fantasy sport league.

FIG. 4B is an augmented screen shot taken from a Yahoo.com Fantasy Football league page illustrating an example embodiment of scoring in a fantasy sport league, with a row added to reflect bonus points earned by each fantasy-team-owner.

FIG. 6 is a screen shot taken from a Yahoo! Salary Cap Football, Fantasy Sport league page illustrating an example embodiment rules for a salary cap league.

DETAILED DESCRIPTION OF THE INVENTION

A description of example embodiments of the system follows. In one embodiment, the system involves incorporating fantasy-team-owners' (e.g., sedentary game players') objectively assessed physical activity data into a Fantasy Sport game.

Figure 1A:
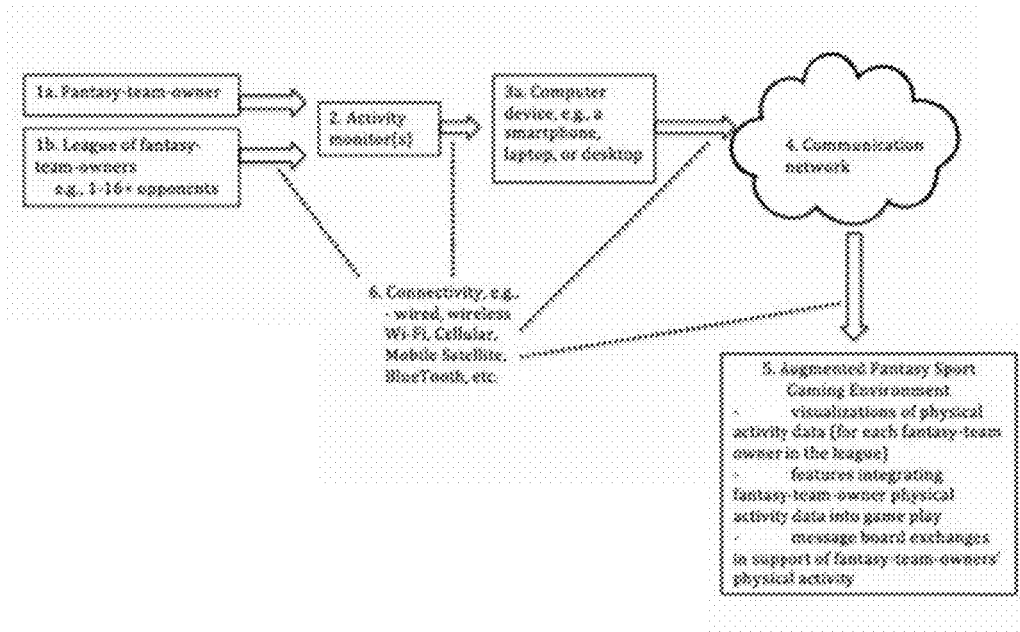
FIG. 1A is a block diagram illustrating a system for integrating fantasy-team-owners' objectively assessed physical activity data into a Fantasy Sport gaming platform in accordance with a particular embodiment of the present system (e.g., with a separate computing device & activity monitor).

FIG. 1A is a block diagram illustrating a system for integrating fantasy-team-owners' objectively assessed physical activity data into a Fantasy Sport gaming platform in accordance with a particular embodiment of the present system. The Fantasy Sport gaming platform is a social network gaming platform where performance is based on a third party's performance in an activity not including the fantasy sport. Examples include but are not limited to Yahoo Fantasy Sports, ESPN Fantasy Sports, and any other type of Fantasy Sport gaming platform. Fantasy Sport gaming platform does not include video games including virtual reality games such as Nintendo Wii or Xbox Kinect. This system involves using one or more activity monitors that connect with a web-enabled computing device, for example, a computer, cell phone, or tablet, in order to transmit fantasy-team-owners' data to a communication network. In another embodiment, the activity monitor may be coupled directly to the communication network.

Figure 1B:
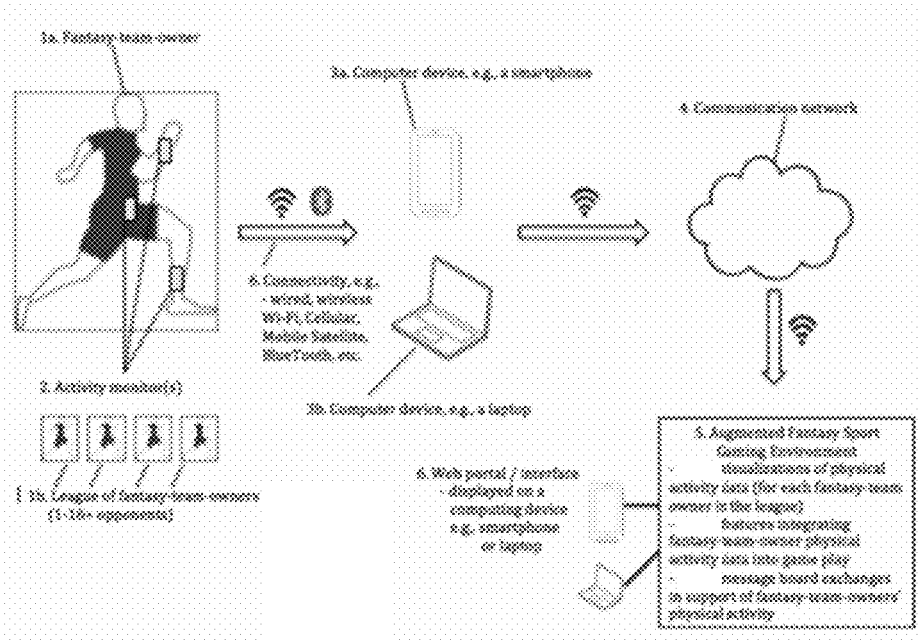
FIG. 1B is a block diagram illustrating a system for integrating fantasy-team-owners' objectively assessed physical activity data into a Fantasy Sport gaming platform in accordance with a particular embodiment of the present system (e.g., with a separate computing device & activity monitor worn on body).
Figure 1C:
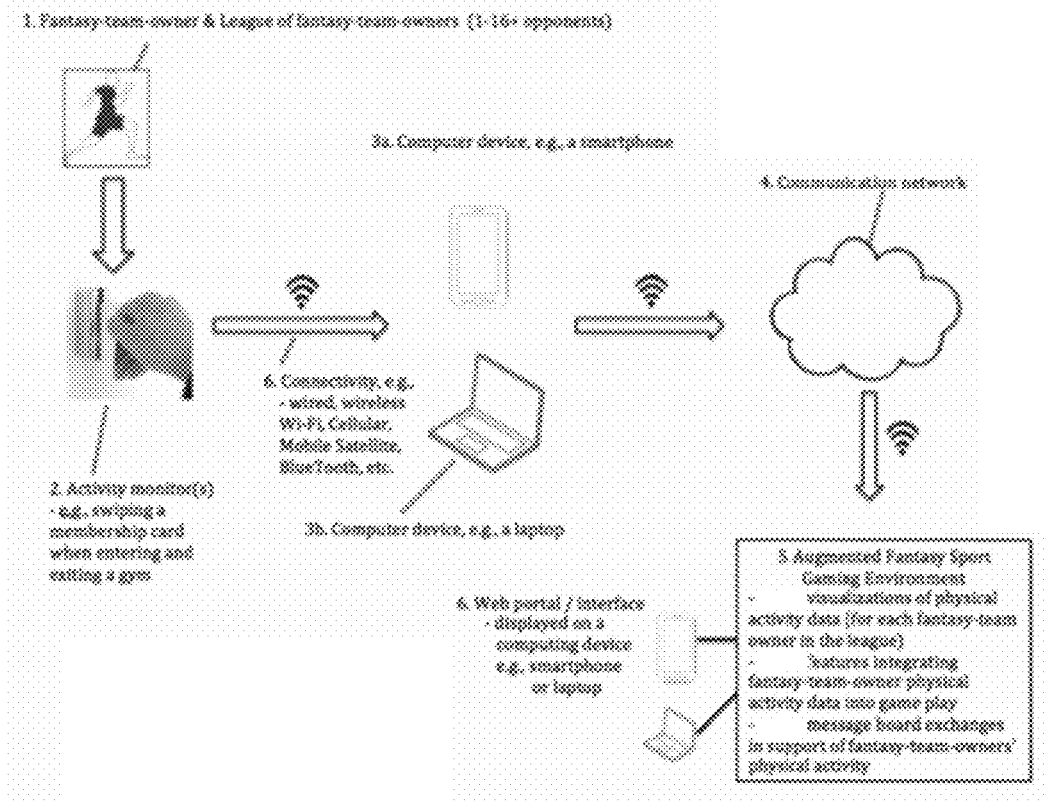
FIG. 1C is a block diagram illustrating a system for integrating fantasy-team-owners' objectively assessed physical activity data into a Fantasy Sport gaming platform in accordance with a particular embodiment of the present system (e.g., with a separate computing device & activity monitor not worn on body).
Figure 1D:
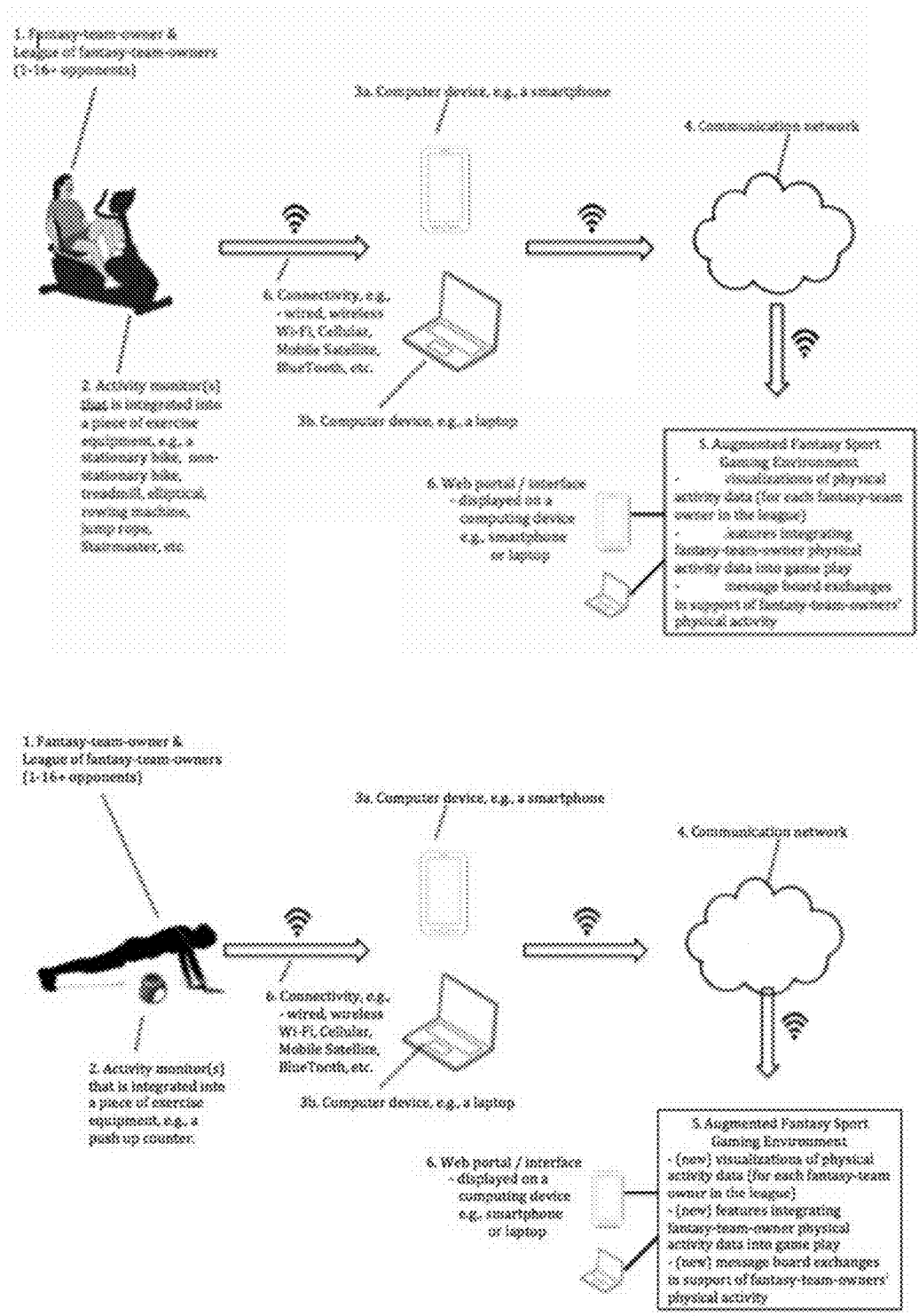
FIG. 1D is a block diagram illustrating a system for integrating fantasy-team-owners' objectively assessed physical activity data into a Fantasy Sport gaming platform in accordance with a particular embodiment of the present system (e.g., with a separate computing device & activity monitor not worn on body).

FIG. 1B is one elaboration of FIG. 1A. The diagram illustrates a system for integrating fantasy-team-owners' objectively assessed physical activity data into a Fantasy Sport gaming platform in accordance with a particular embodiment of the present system. This system involves using one or more activity monitors that connect with a web-enabled computing device in order to transmit fantasy-team-owners' data to a communication network. In another embodiment, the activity monitor may be coupled directly to the communication network. FIG. 1C is a second elaboration of FIG. 1A. The diagram illustrates a system for integrating fantasy-team-owners' objectively assessed physical activity data into a Fantasy Sport gaming platform in accordance with a particular embodiment of the present system. This system involves swiping or scanning a membership card or identification device when entering and exiting a gym. The machine records the amount of time each fantasy-team-owner spends at the gym, and connects with a web-enabled computing device in order to transmit fantasy-team-owners' data to a communication network. In another embodiment, the activity monitor may be coupled directly to the communication network. FIG. 1D is a second elaboration of FIG. 1A. The diagram illustrates a system for integrating fantasy-team-owners' objectively assessed physical activity data into a Fantasy Sport gaming platform in accordance with a particular embodiment of the present system. This system involves using a piece of exercise equipment with an integrated activity monitor. The activity monitor (which is integrated into the exercise equipment) connects with a web-enabled computing device in order to transmit fantasy-team-owners' data to a communication network. In another embodiment, the activity monitor may be coupled directly to the communication network.

Figure 1E:
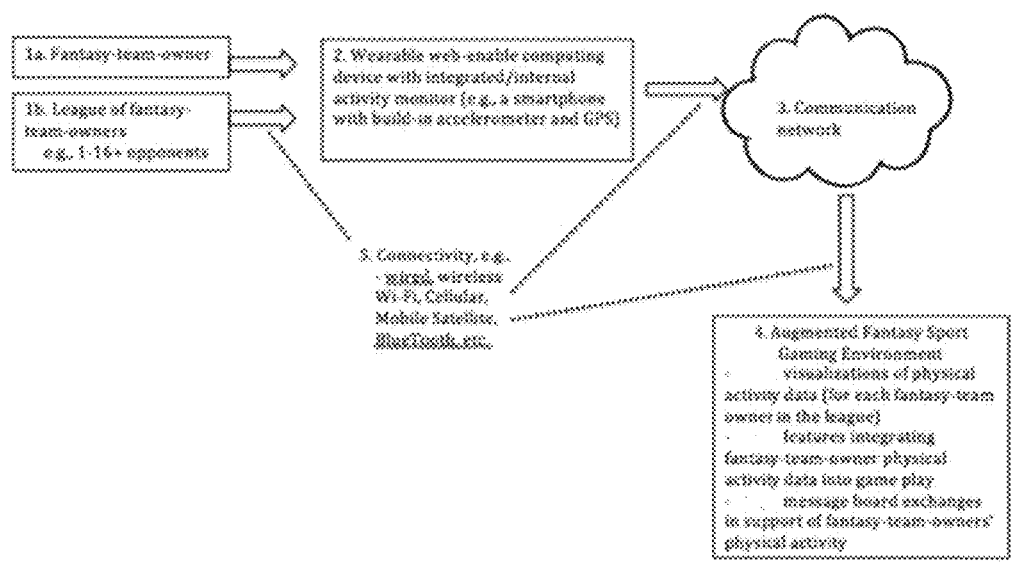
FIG. 1E is a block diagram illustrating a system for integrating fantasy-team-owners' objectively assessed physical activity data into a Fantasy Sport gaming platform in accordance with a particular embodiment of the present system (e.g. with an integrated computing device & activity monitor).
Figure 1F:
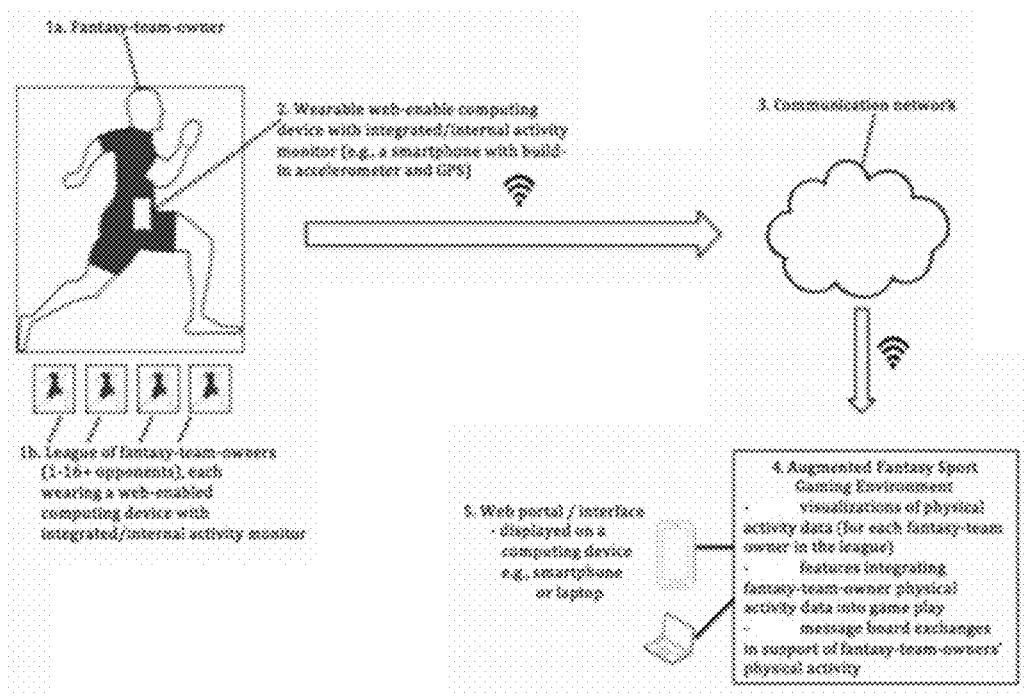
FIG. 1F is a block diagram illustrating a system for integrating fantasy-team-owners' objectively assessed physical activity data into a Fantasy Sport gaming platform in accordance with a particular embodiment of the present system (e.g., with an integrated computing device & activity monitor).

FIG. 1E is a block diagram illustrating a system for integrating fantasy-team-owners' objectively assessed physical activity data into a Fantasy Sport gaming platform in accordance with a particular embodiment of the present system. This system involves the fantasy-team-owner(s) wearing a web-enabled computing device with integrated/internal activity monitor (e.g., a smartphone with built-in accelerometer and GPS). FIG. 1F is an elaboration of FIG. 1E. The diagram illustrates a system for integrating fantasy-team-owners' objectively assessed physical activity data into a Fantasy Sport gaming platform in accordance with a particular embodiment of the present system. This system involves the fantasy-team-owner(s) wearing a web-enabled computing device with integrated/internal activity monitor (e.g., a smartphone with built-in accelerometer and GPS).

FIG. 2 is an example of a draft order for a Fantasy Sport league that involves "snaking" priority for a league with four teams (Owners A through D). At the beginning of a Fantasy Sport season, teams take turns "drafting" or "picking" players for their teams. Each team can own a limited number of players, and no player can be owned by more than one fantasy-team-owner simultaneously. The order of the first four picks is traditionally determined by a random lottery. In accordance with an embodiment of the present system, rather than being determined by random lottery, the draft order is determined by fantasy-team-owners' physical activity prior to the draft.

Figure 3A:
FIG. 3A is a screen shot taken from a Yahoo.com Fantasy Football league page illustrating an embodiment of waiver priority in a fantasy sport league.
Figure 3B:
FIG. 3B is a screen shot taken from a Yahoo.com Fantasy Football league page illustrating another embodiment of waiver priority in a fantasy sport league.
Figure 4B:
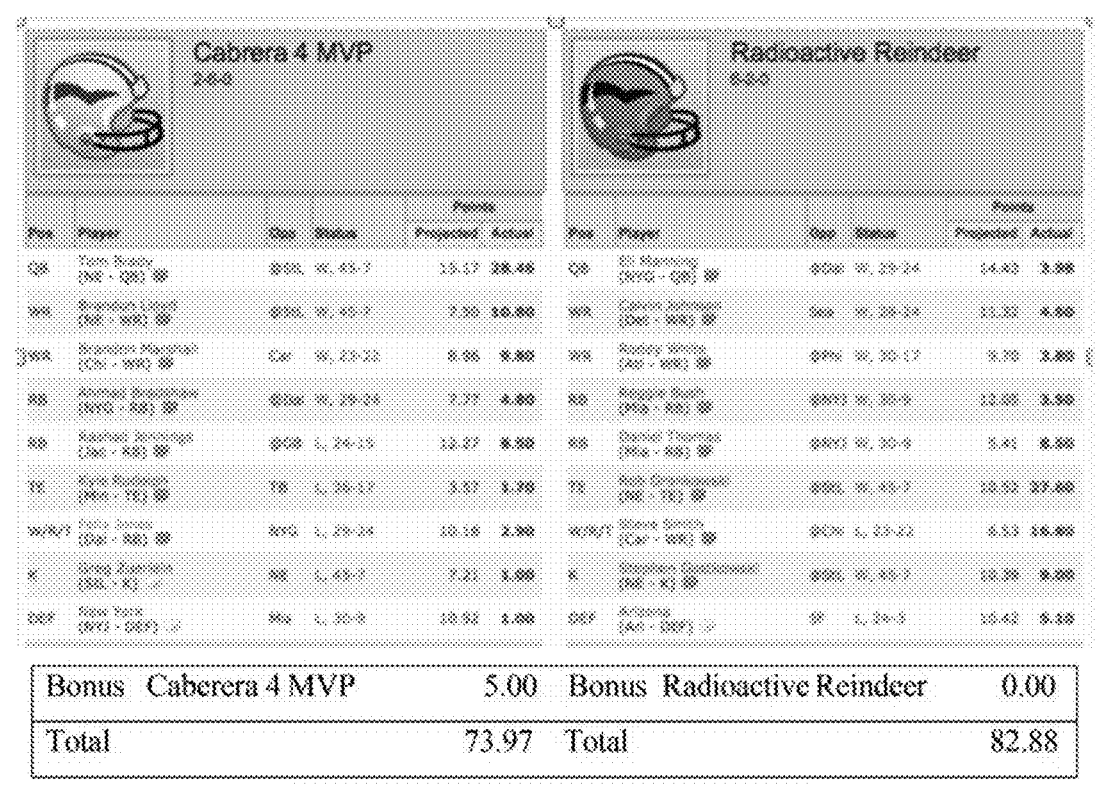
Figure 4C:
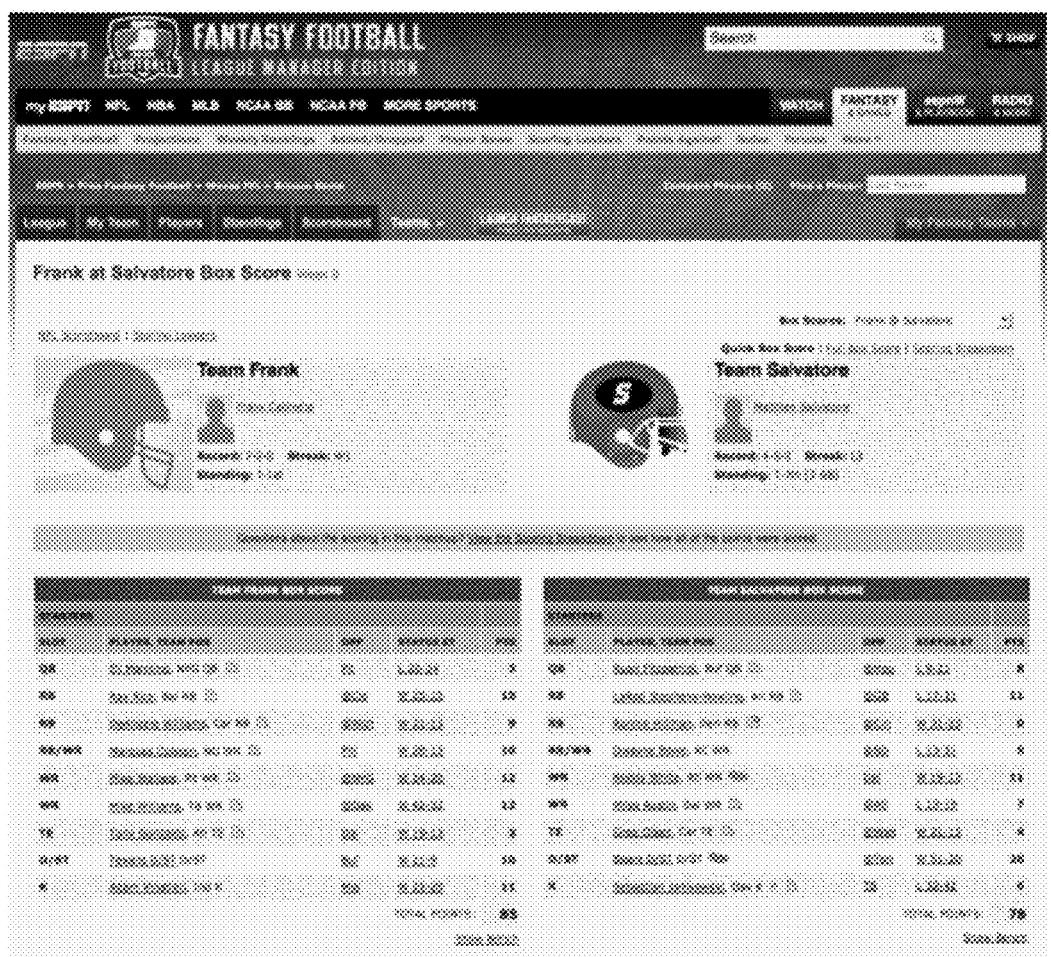
FIG. 4C is a screen shot taken from an ESPN.com Fantasy Football league page illustrating an example embodiment of scoring in a fantasy sport league.

FIG. 3A is a screen shot taken from a Yahoo.com Fantasy Football league page. The "waiver" column (the second column from the right) indicates the order of priority in terms of when fantasy-team-owners can select athletes from a pool of unclaimed athletes (e.g., the "waiver wire"). In this case, the waiver wire order (during Week 1 of the season) is a reverse function of the draft order. In the proposed system, waiver wire priority is set based on fantasy-team-owners' physical activity during the week prior. FIG. 3B is a screen shot taken from a Yahoo.com Fantasy Football league page. In FIG. 3B, the waiver column (the second column from the right) indicates the order of priority in terms of when game players/fantasy-team-owners can select athletes from a pool of unclaimed athletes (the "waiver wire"). In this case (at the beginning of Week 2), the waiver wire order is set as a reverse function of the points scored during the prior week (Week 1); a policy/rule designed to increase parity. In one embodiment, waiver wire priority is set based on fantasy-team-owners' physical activity during the week prior. FIG. 3C is a table illustrating an embodiment in which weekly waiver wire priority is set based on fantasy-team-owners' physical activity (claim 3). In this embodiment, the "waiver order" column (on the right) indicates the order of priority in terms of when fantasy-team-owners can select athletes from a restricted pool of unclaimed athletes (e.g., the "waiver wire"). In this case, the waiver wire order is a function of the fantasy-team-owners' relative physical activity during the prior week. FIG. 4A is a screen shot taken from a Yahoo.com Fantasy Football league page. In FIG. 4, data from a weekly head-to-head competition between two fantasy-team-owners is summarized. Fantasy-team-owner A ("Radioactive Reindeer") defeated fantasy-team-owner B ("Cabrera 4 MVP") by a score of 82.88 to 68.96. Team score was a function of real athletes' performance that week at 9 positions (QB, WR, WR, RB, RB, TE, W/R/T, K, and DEF). In a modified system, an additional (e.g., a to position is added to reflect each fantasy-team-owner's performance (physical activity) that week. Activity contingent bonus points based on each fantasy-team-owner's performance is then added to their total score. FIG. 4B is an augmented screen shot taken from a Yahoo.com Fantasy Football league page with a row added to reflect bonus points earned by each fantasy-team-owner. FIG. 4C is a screen shot taken from an ESPN.com Fantasy Football league page. In FIG. 4C, data from a weekly head-to-head competition between two fantasy-team-owners is summarized. Fantasy-team-owner A ("Team Frank") defeated fantasy-team-owner B ("Team Salvatore") by a score of 85 to 78. Team score was a function of real athletes' performance that week at 9 positions (QB, RB, RB, RB/WR, WR, WR, TE, D/ST, and K). In a modified system, an additional (e.g., a $10^{th}$) position is added to reflect each fantasy-team-owner's performance (physical activity) that week. Physical-activity-contingent bonus points based on each fantasy-team-owner's performance is then added to their total score.

Figure 4D:
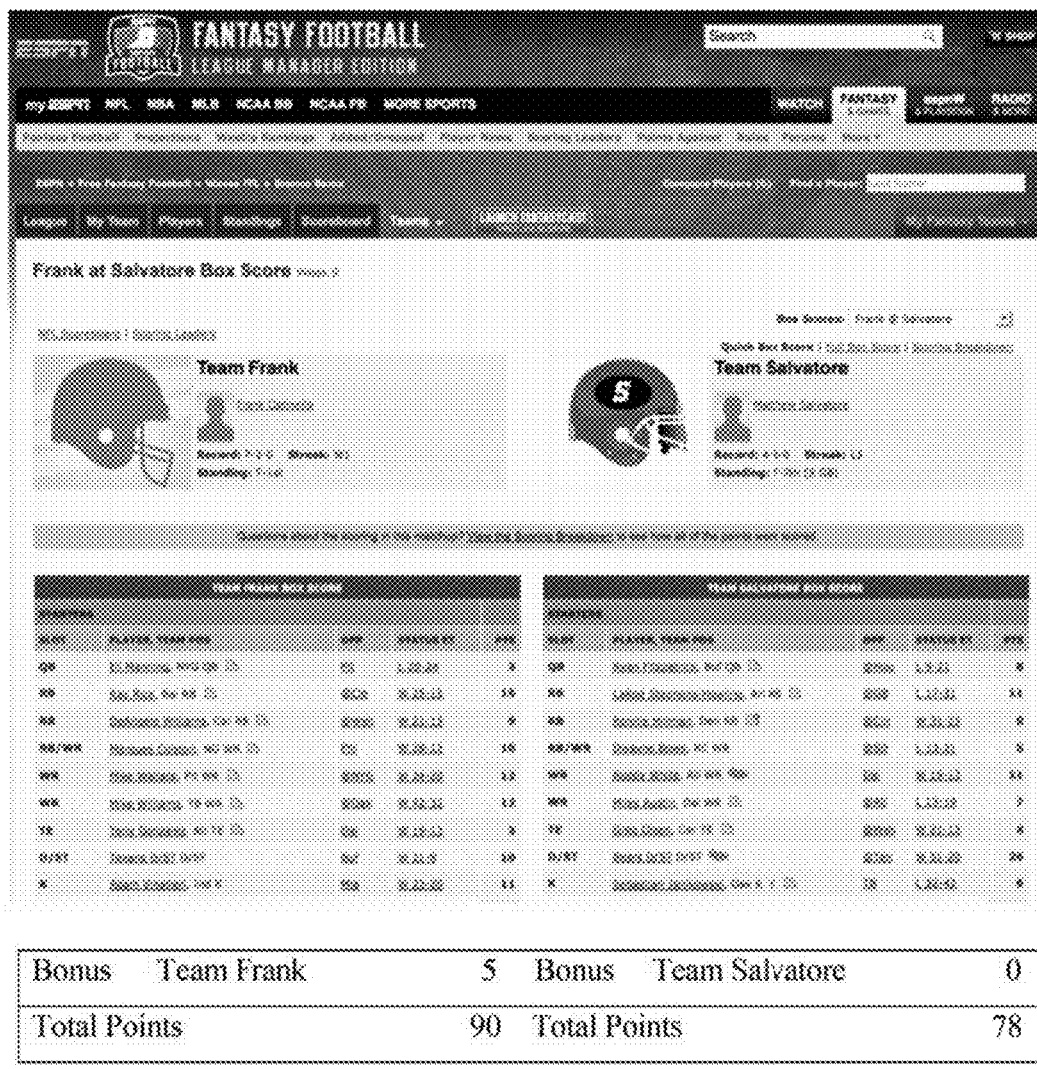
FIG. 4D is an augmented screen shot taken from an ESPN.com Fantasy Football league page illustrating an example embodiment of scoring in a fantasy sport league, with a row added to reflect bonus points earned by each fantasy-team-owner.

FIG. 4D is an augmented screen shot taken from an ESPN.com Fantasy Football league page with a row added to reflect bonus points earned by each fantasy-team-owner.

Figure 5A:
FIG. 5A is a screen shot taken from a Yahoo.com Fantasy Football league page illustrating a count of transactions for members of a fantasy sport league.
Figure 5B:
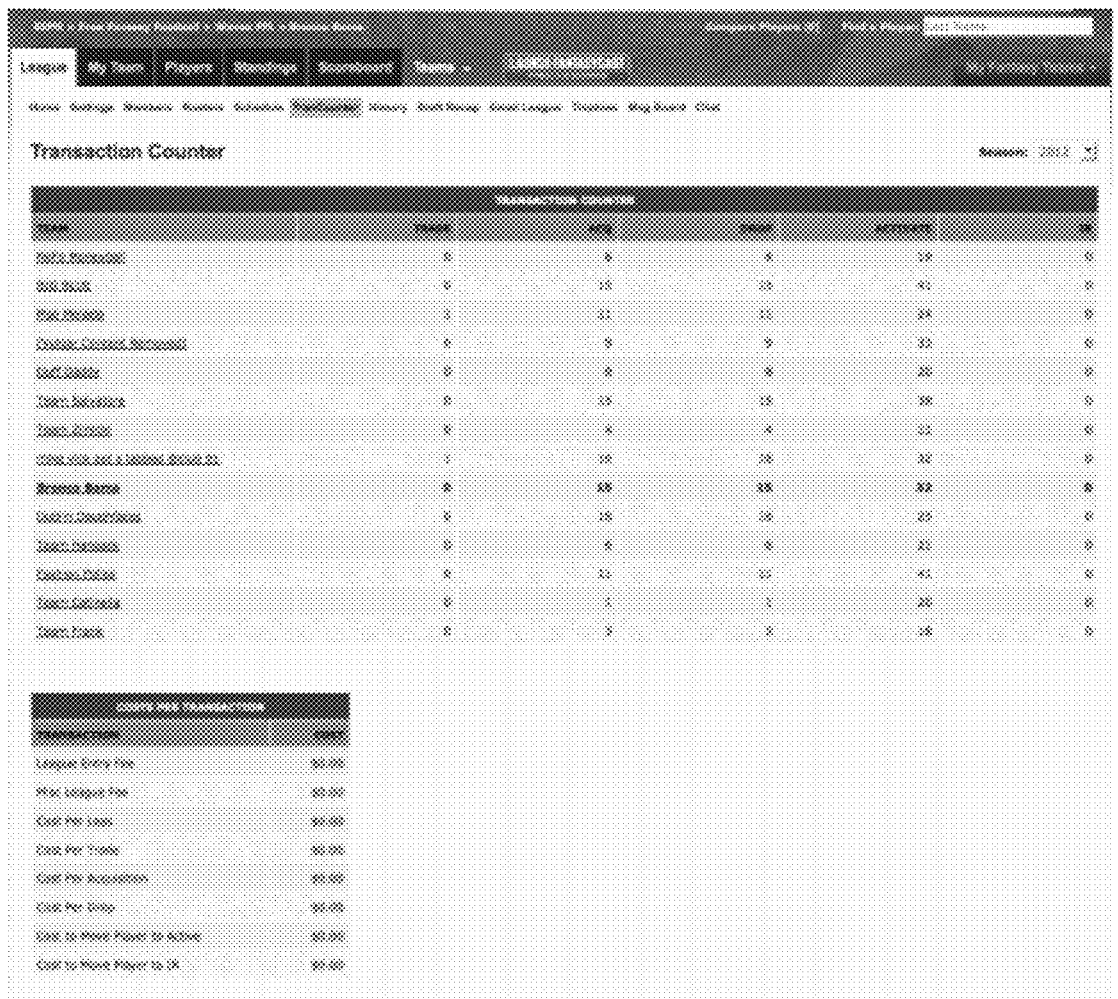
FIG. 5B is a screen shot taken from an ESPN.com Fantasy Football league page illustrating a count of transactions for members of a fantasy sport league.

FIG. 5A is a screen shot taken from a Yahoo.com Fantasy Football league page. In FIG. 5A, the "Moves" column (far right) indicates the number of transactions made by each fantasy-team-owner over the course of the season. In this case (at the beginning of Week 9), the number of "moves" or transactions ranges from 1 to 23, and the league rules specify an unlimited number of moves during the season. In a modified system, number of moves or transactions (e.g., the number of moves allowed in a given week) is limited based on fantasy-team-owners' physical activity (e.g., during the week prior). FIG. 5B is a screen shot taken from an ESPN.com Fantasy Football league page. In FIG. 5B, the number of "moves" or "transactions" made by each fantasy-team-owner is tracked over the course of the season. In this case (at the beginning of Week 10), the number of player "acquisitions" (ACQ) ranges from 1 to 16, and the league rules specify an unlimited number of acquisitions during the season, and no cost per acquisition. In a modified system, the number of transactions (e.g., the number of acquisitions allowed in a given week) is limited based on fantasy-team-owners' physical activity (e.g., during the week prior).

FIG. 6 is a screen shot taken from a Yahoo! Salary Cap Football, Fantasy Sport league page. The rules above explain that all users (fantasy-team-owners) will have the same fixed salary cap, $100 million, for the 2012 season. In a modified system, the salary cap or payroll varies from fantasy-team-owner to fantasy-team-owner based on fantasy-team-owners' physical activity during the week prior.

Physical activity can be objectively assessed and visualized in a variety of ways (e.g., using accelerometry, global positioning systems (GPS), and biomarkers). For example, there are a number of commonly used algorithms for translating raw accelerometer data into: activity counts, steps, energy expenditure, metabolic equivalent units (METs), or time spent at various levels of activity intensity (e.g., minutes of moderate-to-vigorous activity). More advanced activity monitoring systems integrate data from several sensors to more accurately estimate physical activity (e.g., combining accelerometer data, with data from heart rate, breathing rate, and skin conductance sensors). An example of a less sophisticated activity monitoring system involves swiping a membership card (or any identification device) when entering and exiting a gym. These types of data can be used to derive number of minutes spent in the gym and presumably being physically active.

Physical data can also be objectively assessed by utilizing data from athletic activities. In some sports (e.g., golf), electronic systems exist for recording amateur athletes' frequency and level of performance (e.g., the United State Golf Association outlines a system for recording scores and calculating a handicap, and companies like My Score Card (http://www.myscorecard.com) facilitate the input and storage of those data). In one embodiment, the physical activity data consist of this type of data that relate to sporting events in real life (e.g., rounds of golf played and recorded on myscorecard.com).

Physical data may also be gathered from motion detection equipment. Examples of motion capture equipment are Microsoft's Xbox Kinect, Sony PlayStation Move and Eye-Toy, and the Leap Motion device.

Another type of physical activity data is points accumulated in a synchronous exergame. In this case, points earned while playing a synchronous exergame (e.g., Nike Kinect Trainer or Wii Bowling) is used as physical activity data.

Activity data may also be gathered from pushup counters. For example, devices like the Perfect Pushup Counter can count pushups and time between repetitions each time a person's chest presses against a sensor with sufficient force.

Objective assessments of fantasy-team-owner's physical activity are incorporated into the game in addition to data derived from ("real") professional or college athletes' activity. This approach incorporates activity monitoring into a very specific, well-established platform, and includes a set of specific methods that do not disrupt the integrity of well-established Fantasy Sport platforms. Several methods are described for leveraging the established devotion of sedentary Fantasy Sport enthusiasts in ways that preserve or enhance the already complex game and online community features, while adding features that promote greater physical activity.

Although the complexity of Fantasy Sports makes the incorporation of fantasy-team-owners' physical activity data more challenging relative to other online game or community platforms, there are several aspects of Fantasy Sports that make addressing these challenges with the proposed system worthwhile. First, prior efforts to combine gaming or online community features with activity monitoring data have struggled to attract men (relative to women). By leveraging a specific, well-established online community (e.g., online Fantasy Sport leagues) that has traditionally attracted more men (relative to women), the proposed system can help health professionals reach an otherwise underserved population (e.g., overweight and sedentary men). Second, the complexity of Fantasy Sport platforms contributes to the enduring appeal of these games relative to other online games. Many Fantasy Sport leagues last several months, and fantasy-team-owners often play in the same league year after year. Many, if not all, online or video games that have been designed with the express purpose of straight-forwardly converting game player's activity into a game environment (e.g., Wii Sports or Kinect adventure), lack the enduring appeal of Fantasy Sport. Third, those alternative online games that have proven enduring appeal (e.g., World of Warcraft, Second Life, and other Massive Multiplayer online games) tend to lack themes that are as copasetic to encouraging physical activity as the themes inherent to Fantasy Sports. Engaging in Fantasy Sports as a fantasy-team-owner should bring to mind thoughts and imagines related to physical activity ("priming"), which make engaging in physical activity and meeting physical activity goals easier for fantasy-team-owners, relative to gamers playing alternative online games.

Some embodiments may be used as a framework to integrate activity data into a pre-existing platform (e.g., fantasy sport, electronic platform games, board games, computer games, etc.). Activity data is delivered to the pre-existing platform in a format that allows the integration of the activity data into the pre-existing platform. In this way, the proposed system can increase the health of potentially sedentary users of the pre-existing platform. For example, "Fantasy Congress" was an online fantasy simulation sport where players, called citizens, could draft members of the United States House and Senate, and keep track of their participation within the U.S. Congress. Actions, especially within the process of making and amending pieces of legislation, of a player's drafted congresspersons were recorded and rated as a cumulative total amount of points against other players. Although not an "athletic" or "sport" context, this pre-existing platform (Fantasy Congress) shared many of the features that define Fantasy Sports described herein; thus, many embodiments and corresponding methods for integrating objectively assessed physical activity data apply.

The disclosed embodiments can be executed in ways that do not promote elevated risk of injury to game players (fantasy-team-owners) by virtue of encouraging too much physical activity. Many sedentary adults would benefit greatly from incorporated relatively small amounts of physical activity into their lives, whereas higher levels can put them at risk of injury. The disclosed embodiments encourage safe and individual-appropriate increases in physical activity by outlining options for using either absolute or normative standards for awarding activity contingent points or privileges.

The following is an outline of Fantasy Sport terminology that may be helpful for interpreting more detailed descriptions. Fantasy Sport (also known as rotisserie, roto, or owner simulation) is a type of game where participants act as fantasy-team-owners to build a team that competes against other fantasy-team-owners based on the statistics generated by the real individual players or teams of a professional (or college) sport. One variant converts statistical performance of real individual players or teams into points that are compiled and totaled according to a roster selected by a fantasy-team-owner that makes up a fantasy team. Each fantasy team includes a roster with a pre-determined number of players. Fantasy-team-owners have the ability to determine their limited roster of players by: (i) "drafting" players prior to the start of the fantasy season, (ii) "trading" or exchanging players with other fantasy-team-owners, (iii) "cutting" or "dropping" players, and (iv) "signing" or "adding" players from a pool of unclaimed players (players that aren't owned by another fantasy-team-owner). Unclaimed players may be unrestricted "free agents" or restricted members of a "waiver-wire." In some variants, after a player is dropped by a fantasy-team-owner or performs in the real world, that player is placed on the restricted "waiver-wire" for a specified amount of time. During that waiting period, fantasy-team-owners may file a "claim" or request to add the restricted player. If more than one fantasy-team-owner claims (requests to add) the same restricted player, league-specific rules dictate "waiver-wire-priority"; that is, which owner will be allowed to add the player when the waiting period ends.

The following example embodiments for integrating objectively assessed fantasy-team-owner physical activity. In one embodiment, the integration includes activity contingent draft order. In some variants, draft order in Fantasy Sport leagues is determined by lottery, thus each fantasy-team-owner has an equal chance of being awarded the first (or any other) draft pick. One method of integrating objectively assessed fantasy-team-owner physical activity involves a modified lottery system whereby fantasy-team-owners' objectively assessed physical activity in the weeks prior to the start of the fantasy season improves a fantasy-team-owner's chances of being awarded higher/preferred draft pick position. Alternatively, the draft order is determined directly by the rank order of fantasy-team-owners' objectively assessed physical activity during the weeks prior to the start of the fantasy season (i.e., draft order contingent on fantasy-team-owners' preseason physical activity). See FIG. 2.

In one embodiment, the integration includes activity contingent waiver wire priority. In some Fantasy Sport leagues, fantasy-team-owners pick up previously unclaimed athletes from a "waiver wire." The order or priority in terms of who may select from this pool of restricted unclaimed athletes is determined in a number of different ways (e.g., rotating based on prior use, see FIG. 3B; or based on the prior week's fantasy points scored, see FIG. 3C). One method of integrating objectively assessed fantasy-team-owner physical activity involves making the waiver wire selection order a function of fantasy-team-owners' objectively assessed physical activity that day (or week) relative to other fantasy-team-owners in the league (see FIG. 3A).

In one embodiment, the integration includes activity contingent bonus points. Points are earned in Fantasy Sport exclusively based on professional or college athletes' performance. One method of integrating objectively assessed fantasy-team-owner physical activity allocates a small number of bonus points to the fantasy-team-owners' real performance (e.g., measured physical activity). These bonus points can be earned in a number of different ways. One method for earning bonus points involves reaching a target physical activity goal each week (e.g., an absolute standard for success). For example, a shared league activity goal may include recording 150 minutes of moderate-to-vigorous intensity physical activity over 7 days. All fantasy-team-owners who meet or exceed that goal (an absolute standard) can be awarded an additional amount of points (e.g., 5 points), to be combined with the points scored by their team roster of players/athletes. Absolute standards for earning bonus points can also be incremental. For example, 50 to 99 minutes of moderate-to-vigorous intensity physical activity over 7 days may earn 1 bonus point, 100-149 minutes may earn 3 bonus points, and 150 or more minutes may earn 5 bonus points. A second method for earning bonus points involves being more physically active than another fantasy-team-owner in a head-to-head matchup during a given week (e.g., a normative standard for success). For example, in a league that features head-to-head match ups, fantasy-team-owners are trying to score more points than another fantasy-team-owner in their league (opponents rotate from week to week). In this case, the fantasy-team-owner who records more minutes of physical activity relative to his or her opponent (a normative standard) may be awarded 5 points, to be combined with the points scored by their team roster of players/athletes. Activity data is integrated in such a way as to not encourage levels of physical activity that are unsafe or risk injury to some fantasy-team-owners. A third method for awarding bonus points involves awarding bonus points based on a combination of fantasy-team-owner activity and player/athlete performance using a "multiplier." In this case, the number of bonus points awarded can be linked to a specific player/athlete on the fantasy-team-owner's roster. Fantasy-team-owners select in advance the player/athlete to be eligible for this purpose; then, if the fantasy-team-owner met his or her goal (using either an absolute or normative standard), the number of fantasy points earned by the selected player/athlete is multiplied by a given factor (e.g., by a factor of 2). For example, if the player/athlete's performance earned 9 fantasy points, and the fantasy-team-owner met his or her goal, an additional 9 bonus points are awarded. FIG. 4A-4D help illustrate how activity contingent bonus points are awarded. In another embodiment, a fantasy team owner can, at any time, self-impose more challenging activity goals, (weekly or overall) than would otherwise be assigned by the fantasy network.

In another embodiment, physical activity can be linked to privileges that may be awarded. For example, if physical activity goals are met, the owner can be given access to post messages on a league public message board. The continued access to the board would be contingent on meeting weekly activity goals; however, if the weekly activity goals are not met, the privilege to the message board would be lost for that week.

In another embodiment, activity data integration includes activity contingent handicapping. In order to facilitate competition among fantasy-team-owners with wide ranging levels of athletic ability/routine physical activity, individual "handicaps" may be calculated based on average past activity (as is often done to facilitate competition in other sports, including golf and bowling). This embodiment involves handicapping individual fantasy-team-owners physical activity for the purpose of enhancing competition with other fantasy-team-owners. Typically, in order to have a handicap (or stable average), athletes (or, in this case, fantasy-team-owners) record a minimum number of data points (e.g., rounds of golf, games bowled, or weeks of physical activity objectively recorded). After a minimum number of data points are recorded, a stable average is calculated and a corresponding handicap is assigned. This handicap is updated when new data points are recorded. When two athletes (or fantasy-team-owners) compete, their relative performance can be adjusted based on their respective handicaps. For example, imagine two fantasy-team-owners (A and B) are in a head-to-head matchup on a given week. The system has previously recorded that Fantasy-Team-Owner A has averaged 130 minutes of moderate-to-vigorous activity per week, and Fantasy-Team-Owner B has averaged 105 minutes of moderate-to-vigorous activity per week. Their respective handicaps dictate that Owner B get 25 minutes added to his or her total activity during the week of their head-to-head competition, in one example. Thus, if during this particular week Fantasy-Team-Owner A completes 130 minutes of activity, and Fantasy-Team-Owner B completes 120 minutes of activity, handicapping dictates that Fantasy-Team-Owner B wins the head-to-head competition (e.g., as Owner A=130 minutes of activity; Owner B=120 minutes of activity+25 minutes of handicap, for a total of 145 combined minutes). The above example illustrates one way that handicapping can be used to facilitate competition during a head-to-head competition for activity contingent bonus points. However, handicapping can also be used to facilitate competition for all of the activity contingent features described herein (e.g., activity contingent draft order, waiver wire, bonus points using goals defined by absolute and normative standards, awards/incentives, number of transactions, and payroll). Importantly, many fantasy-team-owners play in multiple fantasy sport leagues (e.g., fantasy baseball leagues, fantasy football leagues, fantasy baseball leagues, etc.), and participate year-after-year, an established pattern of use that facilitates a handicapping system based on many objectively recorded data points (e.g., days or weeks of physical activity).

In another embodiment, activity data integration includes activity contingent awards/incentives. Some Fantasy Sport leagues award prizes, virtual and/or monetary, to recognize top performers. In this embodiment, award categories include but are not limited to: fantasy-team-owner with the most overall physical activity over the season, and fantasyteam-owner with the biggest increase in physical activity over the course of the season. Award categories also include recognition of personal records for each fantasy-team-owner's performance relative to his or her past performance, e.g., personal record for most active week, and personal record for more active day.

In another embodiment, lack of activity would result in a contingent loss of a player (or players) from the owner's team roster. For example, if the activity goals are not met, the penalty would be loss of a player from the team owner's roster. In one example, upon not meeting activity goals, a player would be dropped at random from the team owner's roster, and then may/may not be made available to other teams. In another example, owners would identify, at the beginning of the week, a player that would be at risk of being dropped ("on the hot seat"); then a failure to meet activity goals would result in the player being dropped and that player may/may not be made available to other teams.

In another embodiment, lack of activity would result in an "involuntary trades" with another team owner. In many versions of traditional fantasy sports, within the season fantasy team owners compete in regular head-to-head competitions with each other (the winner determined by the performance of their respective professional athletes performances that week). In this embodiment, the fantasy team owner who is more physically active during that head-to-head competition would earn the right to exchange one player from his/her team for one player from her/her opponent's team (i.e., an "involuntary trade").

In another embodiment, activity data integration includes activity contingent number of transactions. Some Fantasy Sport leagues limit the number of transactions that can be performed over the course of an entire season, or during a given week (e.g., picking up an athlete from the free agent or waiver wire pool, or trading athletes). This embodiment limits the number of transactions allowed (in a season or week) as a function of fantasy-team-owners achieving given levels of objectively assessed physical activity. For example, a fantasy owner's number of transactions allowed in the season or week can be proportional to the owner's physical activity. FIG. 5A and FIG. 5B illustrate how number of transactions are tracked in a Fantasy Sport league.

In another embodiment, activity data integration includes activity contingent "payroll." Some Fantasy Sport leagues include a "salary cap" and use an auction format for acquiring athletes. Fantasy-team-owners bid on athletes and may spend a limited number of fantasy dollars net in order to field their entire team/roster of athletes. In this format, all fantasy-team-owners typically work with the same or equal number of fantasy dollars, referred to as a "salary cap." This embodiment includes spending limits based on a function of achieving various levels of objectively assessed physical activity in the weeks prior to the start of the fantasy season (e.g., payroll contingent on fantasy-team-owners' preseason physical activity). Activity contingent fantasy "Payroll Caps" (a fantasy-team-owner specific limit, as opposed to a universal, league-wide "salary cap") can have upper and lower limits, and vary from fantasy-team-owner to fantasy-team-owner. The number of fantasy dollars available in. Fantasy Leagues that now use a universal, league-wide salary cap is functionally arbitrary in terms of game play (although the amount is often roughly based on the average payrolls of real teams in the professional sport of interest). For example, Yahoo Salary Cap Fantasy Football set the salary cap at $100 million for the 2012 season (see FIG. 6). Fantasy-team-owners (users) are required to maintain a Team Value at or below this $100 million cap. "The difference between the Salary Cap and your Team Value is captured as Available Cap Room. This value may be used to buy additional players, or swap out cheaper players on your roster for more expensive ones." In this embodiment, the minimum "Payroll Cap" may be set at $80 million, and additional payroll can be earned contingent on fantasy-team-owner's physical activity during the preseason and/or during the regular season. For example, preseason physical activity above one absolute standard (averaging 100 minutes of moderate-to-vigorous activity) may earn a fantasy-team-owner an additional $10 million in Payroll Cap room, or $90 million total; reaching a more difficult absolute standard (averaging 150 minutes) may earn an owner an additional $20 million in Payroll Cap room, or $100 million total; reaching a more difficult absolute standard (averaging 200 minutes) may earn an owner an additional $30 million in Payroll Cap room, or $110 million total; and so on.

Some embodiments include visualizations of fantasy-team-owners' physical activity. Another method for incorporating activity data involves providing visualizations of fantasy-team-owners' physical activity data. For example, time series graphs or figures charting physical activity on a moment-to-moment, day-to-day, and week-to-week basis over the course of the fantasy season. Many established online fantasy sport platforms include the use of avatars (digital characterizations or representations of fantasy-team-owners). As such, another example of a visualization of fantasy-team-owners' activity involves activity contingent changes in the appearance of their avatar. Visualizations of fantasy-team-owners' activity may also include opportunities for fantasy-team-owners to augment physical activity visualizations with text comments and photographs. For example, a fantasy-team-owner can add a text comment to a graph charting his or her physical activity to help explain a bout or period of especially high activity (a "spike"), or post a related photograph (e.g., a photo of the fantasy-team-owner at the finish line of a race, such as the Chicago Marathon).

Some embodiments also include sanctions for evidence of fantasy-team-owner deception. This fosters trust among fantasy-team-owners that objective assessments of physical activity are legitimate and cannot be falsely inflated or deceived (e.g., by a person strapping the activity monitor to a mechanical fan, or by shaking the device in his hand in order to accumulate falsely inflated records of his activity). Activity monitors vary in terms of accuracy, and monitors that integrate data from several sensors are generally more accurate (e.g., integrating accelerometer data with data from a heart rate sensor). Nevertheless, most activity monitors can be tricked or deceived by a motivated user. As such, another method for the proposed system involves outlining sanctions for fantasy-team-owners if evidence of an attempt at (activity monitor) deception is detected. For example, some patterns of accelerometer data are characteristic of non-human movement, and efforts to deceive or falsely inflate estimates of user activity. A tri-axial accelerometer measures movement and acceleration within three-dimensional space; and whereas natural, human movement is likely to vary across all three dimensions, artificial or machine movement may record variations along a single plane (two-dimensional space). Natural, human movement is also characterized by irregularities with regard to accelerometer data, whereas machine generated movement is often more regular with regard to variations in acceleration along specific planes. Informing fantasy-team-owners in advance that data from their activity-monitoring device is subject to future analysis designed to detect falsely inflated activity decreases deception among fantasy-team-owners, and helps preserve the integrity of the game. Examples of sanctions for evidence of falsely inflated activity data include both monetary and virtual punishments. Examples include fines, shaming fantasy-team-owners within the online community, retroactive adjustments to point totals and/or outcomes (wins and losses), temporary suspensions from participation, ban from the playoffs/championship game, and permanent expulsions from participation. Penalties of this kind are analogous to the system and methods that professional sport leagues have implemented to regulate the use of performance enhancing drugs among athletes. The penalties can also escalate from a mild sanction to a more severe sanction if a user violates in multiple times.

Examples of names for this proposed system for integrate fantasy-team-owner activity data into a pre-existing Fantasy Sport platform include: Augmented Fantasy Sports, Fantasy Sports 2.0, Fantasy Sports Plus/+, Active Fantasy Sports, Fantasy Sports for Health, and iterations of these names that substitute the specific sport for the generic term "sports" (e.g., Football, Baseball, Basketball, etc.).

The teachings of all patents, published applications and references cited herein are incorporated by reference in their entirety.

While this system has been particularly shown and described with references to example embodiments thereof, it will be understood by those skilled in the art that various changes in form and details may be made therein without departing from the scope of the system encompassed by the appended claims.

What is claimed is:

1. A method implemented by a computing device, the method comprising:
   receiving, by the computing device, objectively assessed physical activity data relating to at least one owner of a fantasy sport team of a computer-implemented fantasy sport gaming platform, the platform allowing a plurality of fantasy sport league teams, each team managed by at least one owner, the objectively assessed physical activity data further being received relative to other teams of the fantasy sport league;
   compiling, by the computing device, the objectively assessed physical activity data by use of one or more processors; and
   using, by the computing device, objectively assessed physical activity data to provide at least one advantage to the fantasy sport team managed by the at least one owner in the fantasy sport gaming platform;
   wherein receiving the objectively assessed physical activity data further includes receiving the objectively assessed physical activity data from a web-enabled computing device with an integrated or internal activity monitor that is worn by a team owner.

2. The method of claim 1, further comprising providing, by the computing device, visualizations of the objectively assessed physical activity data.

3. The method of claim 1, further comprising detecting, by the computing device, fraudulent falsely inflated physical activity data; and levying sanctions against the fantasy sport team upon said detection.

4. The method of claim 1, wherein providing the advantage to the fantasy sport team includes activity contingent loss of at least one player from another fantasy sports team owned by another owner based on the objectively assessed physical activity data.

5. The method of claim 4, wherein providing the advantage to the fantasy sport team includes awarding bonus points based on the objectively assessed physical activity data.

6. The method of claim 4, wherein providing the advantage to the fantasy sport team includes using a handicapping system based on the objectively assessed physical activity data to facilitate competition with at least one additional fantasy sport team owner, the handicapping system normalizing objectively assessed physical activity data of the fantasy sports teams with physical activity goals of each respective fantasy sports team.

7. The method of claim 4, wherein providing the advantage to the fantasy sport team includes awarding virtual or tangible rewards based on the objectively assessed physical activity data.

8. The method of claim 4, wherein providing the advantage to the fantasy sport team includes adjusting a number of permitted transactions based on the objectively assessed physical activity data.

9. The method of claim 4, wherein providing the advantage to the fantasy sport team includes adjusting a payroll available for virtually acquiring professional athletes based on the objectively assessed physical activity data.

10. The method of claim 9, wherein providing the advantage to the fantasy sport team includes setting a waiver wire selection order based on the objectively assessed physical activity data.

11. The method of claim 10, wherein providing the advantage to the fantasy sport team includes setting a fantasy draft order based on the objectively assessed physical activity data.

12. The method of claim 4, wherein providing the advantage to the fantasy sport team includes activity contingent ability to exchange at least one player from a team owner's roster for at least one player from another team owner's roster based on their relative objectively assessed physical activity data.

13. The method of claim 4, wherein providing the advantage to the fantasy sport team includes contingent access to a fantasy sport league message board based on the objectively assessed physical activity data.

14. The method of claim 1, further comprising receiving, by the computing device, from the at least one owner of the fantasy sport team, settings for personal physical activity goals that impact providing the advantage to the fantasy sport team based on the objectively assessed physical activity data.

15. A method implemented by a computing device of operating a fantasy sport league, the method comprising:
   monitoring, by the computing device, physical activity of one or more owners of a fantasy sport team in a computer-implemented fantasy sport league;
   compiling, by the computing device, physical activity data in a database based on the physical activity of the one or more owners;
   receiving, by the computing device, from one or more computing devices via a communication network, objectively assessed physical activity data indicative of the monitored physical activity, wherein the monitoring comprises the receiving;
   analyzing, by the computing device, the objectively assessed physical activity data to determine a criteria for the one or more owners; and using, by the computing device, the determined criteria, based on the objectively assessed physical activity data to provide an advantage to the fantasy sport team in the fantasy sport league;

wherein monitoring the objectively assessed physical activity data further includes receiving the objectively assessed physical activity data from the one or more computing devices including a web-enabled computing device with an integrated or internal activity monitor that is worn by a team owner.

16. The method of claim 15, wherein monitoring the physical activity comprises a team owner using a piece of exercise equipment with an integrated activity monitor.

17. The method of claim 15, wherein monitoring the physical activity comprises a team owner recording time spent in an exercise facility.

18. A method implemented by a computing device, the method comprising:

tracking, by the computing device, in a database, objectively assessed physical activity data of one or more fantasy sport league team owners of a computer-implemented fantasy sports league during an entirety of a fantasy sport league season;

receiving, by the computing device, from one or more computing devices via a communication network, the objectively assessed physical activity data indicating physical activity of the one or more owners, wherein the tracking comprises the receiving; and using, by the computing device, the objectively assessed physical activity data to provide an advantage to the one or more fantasy sport team owners in the fantasy sport league;

wherein tracking the objectively assessed physical activity data further includes receiving the objectively assessed physical activity data from the one or more computing devices including a web-enabled computing device with an integrated or internal activity monitor that is worn by a team owner.

19. The method of claim 18 wherein the physical activity data is tracked at regular intervals during the fantasy sport season.

* * * * *

UNITED STATES PATENT AND TRADEMARK OFFICE
CERTIFICATE OF CORRECTION

PATENT NO. : 9,878,234 B2
APPLICATION NO. : 14/088632
DATED : January 30, 2018
INVENTOR(S) : Arlen Moller Page 1 of 1

It is certified that error appears in the above-identified patent and that said Letters Patent is hereby corrected as shown below:

In the Claims

In Claim 1, Column 13, Line 47, delete "device, objectively" and insert -- device, the objectively --.

In Claim 3, Column 13, Line 60, delete "fraudulent falsely" and insert -- fraudulent or falsely --.

Signed and Sealed this
Twenty-seventh Day of March, 2018

Andrei Iancu
*Director of the United States Patent and Trademark Office*